(12) United States Patent
Kong

(10) Patent No.: US 12,389,099 B2
(45) Date of Patent: Aug. 12, 2025

(54) CAMERA APPARATUS AND ELECTRONIC DEVICE

(71) Applicant: VIVO MOBILE COMMUNICATION CO., LTD., Guangdong (CN)

(72) Inventor: Deqing Kong, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 154 days.

(21) Appl. No.: 18/128,971

(22) Filed: Mar. 30, 2023

(65) Prior Publication Data

US 2023/0239557 A1 Jul. 27, 2023

Related U.S. Application Data

(63) Continuation of application No. PCT/CN2021/120141, filed on Sep. 24, 2021.

(30) Foreign Application Priority Data

Sep. 30, 2020 (CN) .................. 202011062860.X

(51) Int. Cl.
*H04N 23/55* (2023.01)
*G02B 3/08* (2006.01)
(Continued)

(52) U.S. Cl.
CPC .............. *H04N 23/55* (2023.01); *G02B 3/08* (2013.01); *G02B 5/1814* (2013.01); *G02B 5/1895* (2013.01); *G02B 13/005* (2013.01)

(58) Field of Classification Search
None
See application file for complete search history.

(56) References Cited

U.S. PATENT DOCUMENTS 5,044,706 A 9/1991 Chen
2003/0189755 A1* 10/2003 Okuno .................. G02B 5/1814
  359/569
(Continued)

FOREIGN PATENT DOCUMENTS

CN 1766695 A 5/2006
CN 102077127 A 5/2011
(Continued)

OTHER PUBLICATIONS

Chinese Office Action dated Jul. 30, 2021 as received in application No. 202011062860.X.
(Continued)

*Primary Examiner* — Twyler L Haskins
*Assistant Examiner* — Wesley J Chiu
(74) *Attorney, Agent, or Firm* — Price Heneveld LLP

(57) ABSTRACT

This application discloses a camera apparatus, including a photosensitive chip, a first lens mechanism, a second lens mechanism, and a light filter, where the first lens mechanism is arranged between the photosensitive chip and the second lens mechanism, the second lens mechanism includes a diffractive-refractive lens and a refractive index compensation layer, the refractive index compensation layer is overlapped with the diffractive-refractive lens, the light filter is located between the photosensitive chip and the first lens mechanism, ambient light passing through the second lens mechanism can be refracted and diffracted by the diffractive-refractive lens, and the refracted and diffracted ambient light can be projected onto the photosensitive chip sequentially passing through the first lens mechanism and the light filter.

12 Claims, 4 Drawing Sheets

(51) Int. Cl.
  *G02B 5/18* (2006.01)
  *G02B 13/00* (2006.01)

(56) References Cited

U.S. PATENT DOCUMENTS

| | | | |
|---|---|---|---|
| 2006/0087737 A1 | 4/2006 | Choi | |
| 2006/0262416 A1 | 11/2006 | Lee et al. | |
| 2009/0231712 A1* | 9/2009 | Ushigome | G02B 27/4211 359/569 |
| 2010/0007957 A1* | 1/2010 | Suzuki | G02B 13/0055 359/576 |
| 2010/0110548 A1* | 5/2010 | Korenaga | G02B 27/0018 427/163.1 |
| 2011/0102898 A1 | 5/2011 | Korenaga | |
| 2011/0122305 A1* | 5/2011 | Kobayashi | G02B 27/0037 359/566 |
| 2011/0304918 A1 | 12/2011 | Ushigome | |
| 2012/0008209 A1 | 1/2012 | Ushigome | |
| 2012/0008210 A1 | 1/2012 | Korenaga | |
| 2012/0050868 A1 | 3/2012 | Takayama | |
| 2013/0063812 A1 | 3/2013 | Matsumoto | |
| 2013/0286309 A1 | 10/2013 | Valley | |
| 2020/0319475 A1* | 10/2020 | Ukuda | G02B 1/04 |
| 2022/0365323 A1* | 11/2022 | Niu | G02B 13/009 |

FOREIGN PATENT DOCUMENTS

| | | |
|---|---|---|
| CN | 102369463 A | 3/2012 |
| CN | 102906615 A | 1/2013 |
| CN | 102707428 A | 6/2014 |
| CN | 105572895 A | 5/2016 |
| CN | 210629655 A | 5/2020 |
| CN | 112188063 A | 1/2021 |
| CN | 113126258 A | 7/2021 |
| JP | 2011257689 A | 12/2011 |
| JP | 2012018252 A | 1/2012 |
| JP | 2012048081 A | 3/2012 |
| JP | 2015011293 A | 1/2015 |
| JP | 2019086707 A | 6/2019 |
| KR | 20030032109 A | 4/2003 |
| KR | 20060036234 A | 4/2006 |
| WO | 2011105067 A1 | 9/2011 |

OTHER PUBLICATIONS

International Search Report dated Dec. 16, 2021 as received in application No. PCT/CN2021/120141.

Yi et al., "Study on the design of hybrid diffraction-refractive camera lens" Jun. 2018.

* cited by examiner

CAMERA APPARATUS AND ELECTRONIC DEVICE

CROSS-REFERENCE

The present application is a continuation application of International Application No. PCT/CN2021/120141 filed on Sep. 24, 2021, which claims priority to Chinese Patent Application No. 202011062860.X, filed with the Chinese Patent Office on Sep. 30, 2020, and entitled "CAMERA APPARATUS AND ELECTRONIC DEVICE", which is incorporated herein by reference in its entirety.

TECHNICAL FIELD

This application pertains to the field of communications device technologies, and in particular, to a camera apparatus and an electronic device.

BACKGROUND

The electronic device is usually equipped with a camera apparatus to realize a camera function. With increasing demands of the user for photographing, performance of the camera apparatus is continuously optimized. In order to improve imaging quality, a size of the camera apparatus equipped with the electronic device is getting larger and larger, so that better optical performance can be achieved.

As we know, the electronic device is developing in the direction of thinness, and the thickness of the electronic device is difficult to increase at will. In this case, the increasing size of the camera apparatus conflicts with the demand for thinness of the electronic device, which makes it difficult for the electronic device to configure a camera apparatus with better performance Obviously, this may affect the performance of the electronic device.

SUMMARY

According to a first aspect, an embodiment of this application discloses a camera apparatus, including a photosensitive chip, a first lens mechanism, a second lens mechanism, and a light filter, where the first lens mechanism is arranged between the photosensitive chip and the second lens mechanism, the second lens mechanism includes a diffractive-refractive lens and a refractive index compensation layer, the refractive index compensation layer is overlapped with the diffractive-refractive lens, the diffractive-refractive lens and the first lens mechanism are arranged in sequence in a direction of projecting light to the photosensitive chip, the light filter is located between the photosensitive chip and the first lens mechanism, ambient light passing through the second lens mechanism can be refracted and diffracted by the diffractive-refractive lens, and the refracted and diffracted ambient light can be projected onto the photosensitive chip sequentially passing through the first lens mechanism and the light filter.

According to a second aspect, an embodiment of this application discloses an electronic device, including the camera apparatus described above.

The foregoing technical solutions used in this application can achieve the following beneficial effects.

In the camera apparatus disclosed in the embodiments of this application, the structure of the camera apparatus in Background is improved, so that the second lens mechanism includes the diffractive-refractive lens and the refractive index compensation layer, the refractive index compensation layer is overlapped with the diffractive-refractive lens, the refractive index compensation layer is used to reduce the refractive index difference of the diffraction surface, and when the ambient light passes through the diffractive-refractive lens, the diffractive-refractive lens can enable the chromatic aberration generated in diffraction and the chromatic aberration generated in refraction to cancel each other out. The diffractive-refractive lens and the first lens mechanism are arranged in sequence in the direction of projecting light to the photosensitive chip, the ambient light passing through the second lens mechanism can be refracted and diffracted by the diffractive-refractive lens, and the refracted and diffracted ambient light can be projected by the first lens mechanism, filtered by the light filter, and finally projected onto the photosensitive chip, thus realizing imaging of the photosensitive chip.

Figure 1:
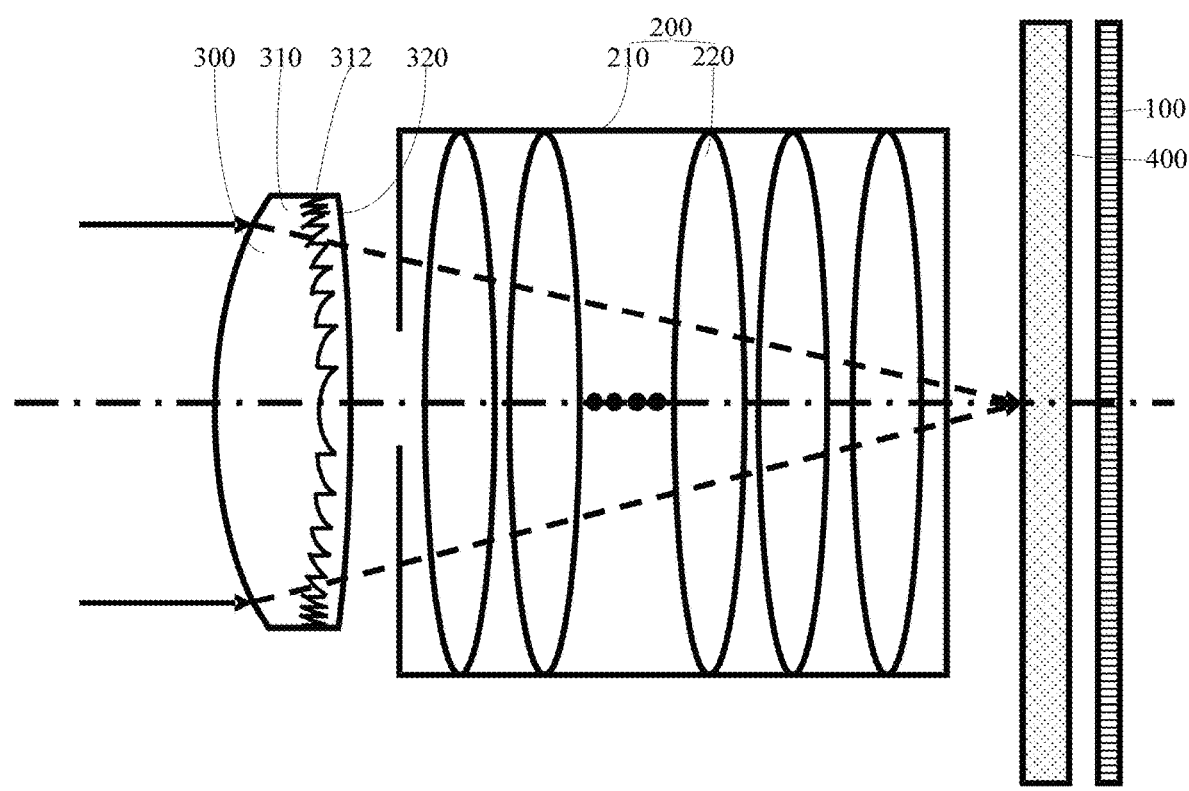
FIG. 1 is a schematic structural diagram of a camera apparatus according to an embodiment of this application.
Figure 2:
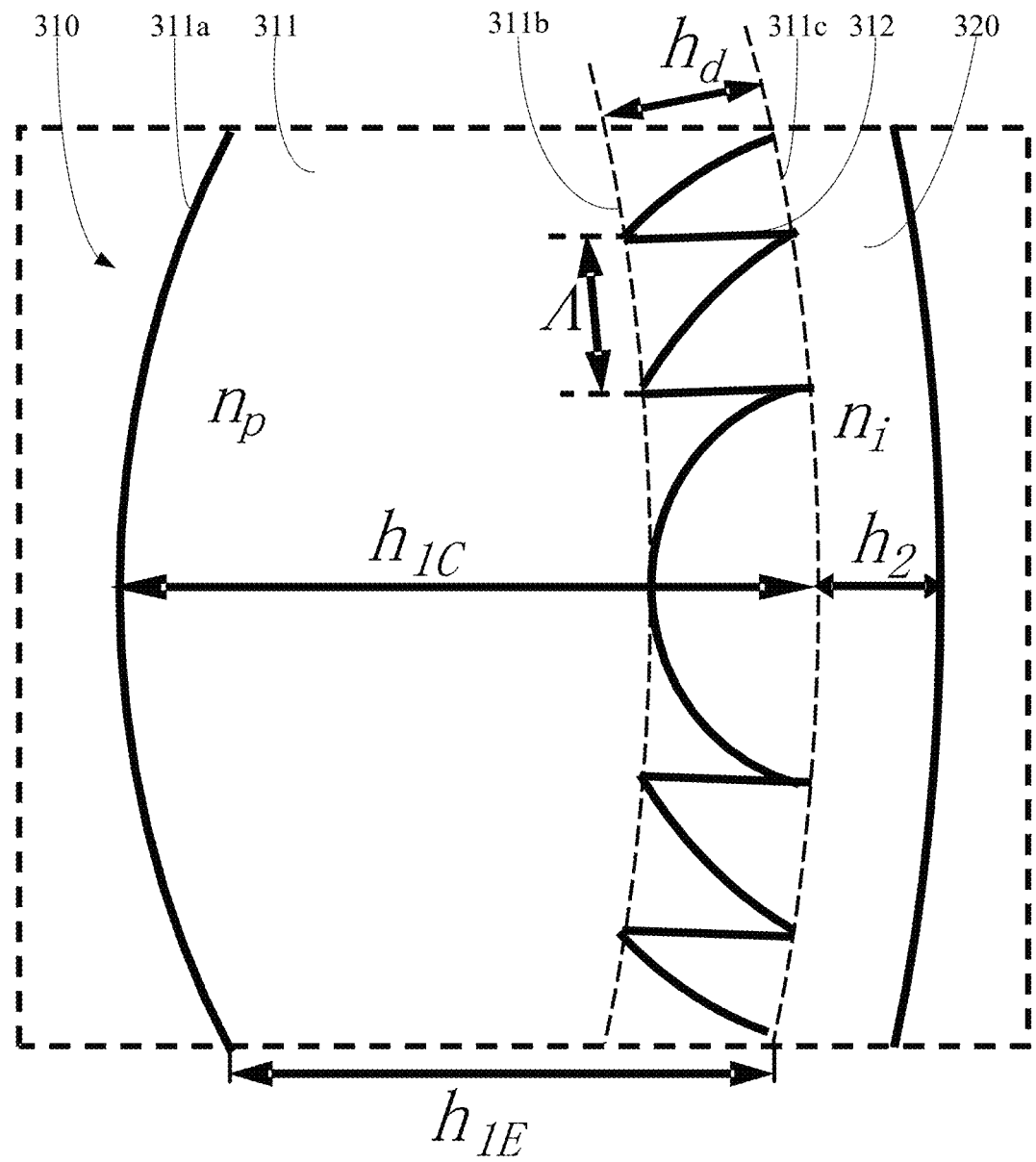
FIG. 2 is a schematic diagram of a partial structure of a second lens mechanism in a first camera apparatus according to an embodiment of this application.
Figure 3:
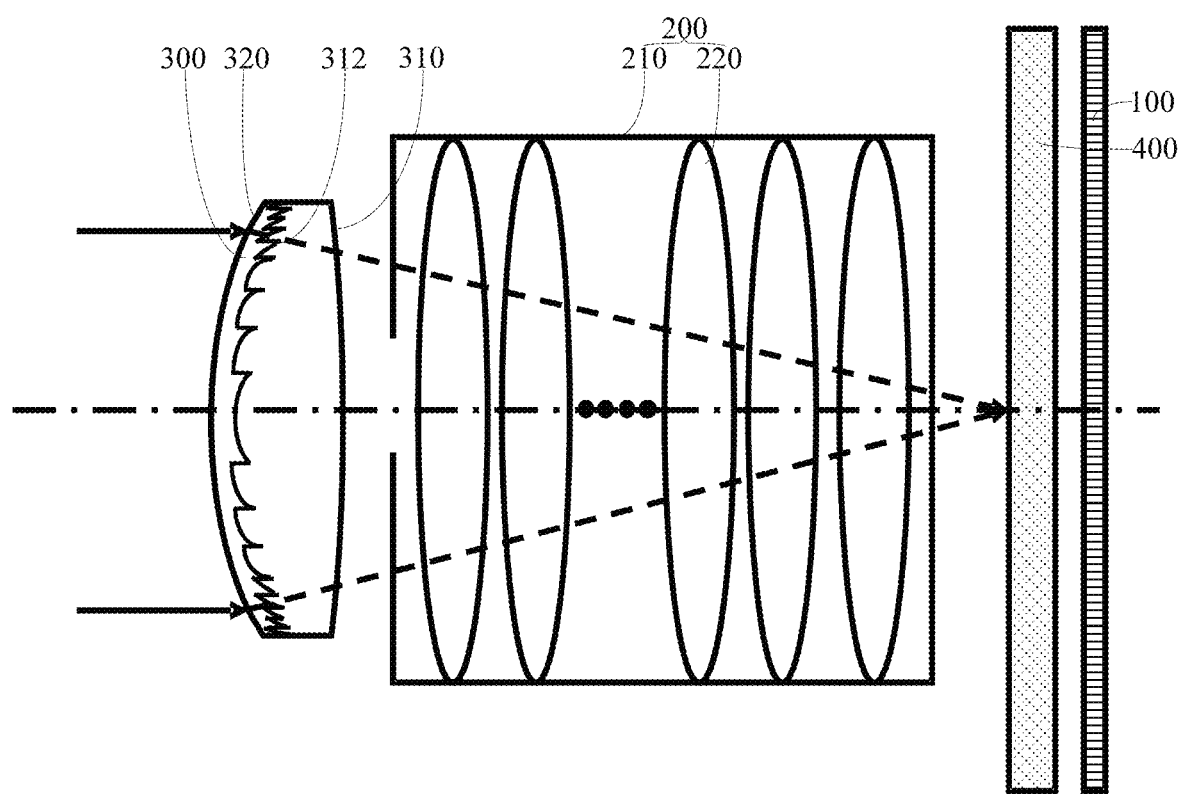
FIG. 3 is a schematic structural diagram of a second camera apparatus according to an embodiment of this application.

Reference numerals in the accompanying drawings are as follows:

100—photosensitive chip,
200—first lens mechanism, 210—lens holder, 220—third lens,
300—second lens mechanism, 310—diffractive-refractive lens, 311—basement layer, 311a—first surface, 311b—second surface, 311c—third surface, 312—diffraction protrusion, 320—refractive index compensation layer,
400—light filter.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "I" generally represents an "or" relationship between associated objects.

The following specifically describes the camera apparatus provided in the embodiments of this application through specific embodiments and application scenarios thereof with reference to the accompanying drawings.

As shown in FIG. 1 to FIG. 4, an embodiment of this application discloses a camera apparatus, and the disclosed camera apparatus includes a photosensitive chip 100, a first lens mechanism 200, a second lens mechanism 300, and a light filter 400.

The photosensitive chip 100 is a component used for imaging in the camera apparatus. In a specific photographing process, ambient light reflected by a photographed object can finally be projected onto the photosensitive chip 100, and a photosensitive surface of the photosensitive chip 100 can convert an optical signal into an electrical signal corresponding to the optical signal, thus achieving the purpose of imaging. In general, the photosensitive chip 100 may be a CCD (Charge Coupled Device) element or a CMOS (Complementary Metal Oxide Semiconductor) device, and a specific type of the photosensitive chip 100 is not limited in the embodiments of this application.

Both the first lens mechanism 200 and the second lens mechanism 300 are light distribution devices. In general, the camera apparatus may include a lens holder, both the first lens mechanism 200 and the second lens mechanism 300 are installed in a lens cone of a lens of the camera apparatus, and then the first lens mechanism 200 and the second lens mechanism 300 are installed by installing the lens on the lens holder.

In the embodiments of this application, the first lens mechanism 200 may include an ordinary lens, such as a convex lens, a concave lens, and the like. A specific type and number of lenses included in the first lens mechanism 200 are not limited in the embodiments of this application. In an optional solution, the first lens mechanism 200 may include a lens holder 210 and at least two third lenses 220, and the at least two third lenses 220 are installed on the lens holder 210, so as to facilitate integrated installation after pre-assembly.

The first lens mechanism 200 is arranged between the photosensitive chip 100 and the second lens mechanism 300. The first lens mechanism 200 and the second lens mechanism 300 are used to process the projected light. The second lens mechanism 300 includes a diffractive-refractive lens 310 and a refractive index compensation layer 320, the refractive index compensation layer 320 is overlapped with the diffractive-refractive lens 310, and the refractive index compensation layer 320 is used to reduce a refractive index difference of a diffraction surface, thereby improving a refraction effect. The diffractive-refractive lens 310 and the first lens mechanism 200 are arranged in sequence in a direction of projecting light to the photosensitive chip 100.

The diffractive-refractive lens 310 can refract and diffract the past ambient light, and according to the principles of refraction and diffraction, it can be learned that chromatic aberration may be generated in both a refraction process and a diffraction process of the ambient light. Because the diffractive-refractive lens 310 can not only refract the ambient light, but also diffract the ambient light, chromatic aberration caused by diffraction that is performed on the ambient light by the diffractive-refractive lens 310 and chromatic aberration caused by refraction that is performed on the ambient light by the diffractive-refractive lens 310 may cancel each other out, thus alleviating or even eliminating the chromatic aberration caused by the ambient light during photographing.

The light filter 400 is located between the photosensitive chip 100 and the first lens mechanism 200, and the ambient light passing through the first lens mechanism 200 can be filtered by the light filter 400 and then projected onto the photosensitive chip 100. The light filter 400 can filter out interference light of the camera apparatus during photographing, and there may be many kinds of light filters 400. In an optional solution, the light filter 400 may be an infrared light filter, which can absorb infrared light in the ambient light passing through the first lens mechanism 200, so that the imaging effect of the camera apparatus becomes better.

In a specific operating process, the ambient light passing through the second lens mechanism 300 can be refracted and diffracted by the diffractive-refractive lens 310, and the refracted and diffracted ambient light can be projected onto the photosensitive chip 100 sequentially passing through the first lens mechanism 200 and the light filter 400.

In the embodiments of this application, the diffractive-refractive lens 310 has a diffraction structure, and the diffraction structure can play a role in diffracting the ambient light. Specifically, the diffraction structure may be located at one side of the diffractive-refractive lens 310, and specifically, the diffraction structure may be located at an image side of the diffractive-refractive lens 310 or at an object side of the diffractive-refractive lens 310. Alternatively, the diffraction structure may certainly be located inside the diffractive-refractive lens 310, as long as it does not affect diffraction of the ambient light, and a specific position of the diffraction structure in the diffractive-refractive lens 310 is not limited in this application.

In the camera apparatus disclosed in the embodiments of this application, the structure of the camera apparatus in Background is improved, so that the second lens mechanism 300 includes the diffractive-refractive lens 310 and the refractive index compensation layer 320, the refractive index compensation layer 320 is overlapped with the diffractive-refractive lens 310, the refractive index compensation layer 320 is used to reduce the refractive index difference of the diffraction surface, thereby improving the refraction effect, and when the ambient light passes through the diffractive-refractive lens 310, the diffractive-refractive lens 310 can enable the chromatic aberration generated in diffraction and the chromatic aberration generated in refraction to cancel each other out. The diffractive-refractive lens 310 and the first lens mechanism 200 are arranged in sequence in the direction of projecting light to the photosensitive chip 100, the ambient light passing through the second lens mechanism 300 can be refracted and diffracted by the diffractive-refractive lens 310, and the refracted and diffracted ambient light can be projected by the first lens mechanism 200, filtered by the light filter 400, and finally projected onto the photosensitive chip 100, thus realizing imaging of the photosensitive chip 100.

Therefore, the camera apparatus disclosed in the embodiments of this application replaces some lenses with the diffractive-refractive lenses 310 by setting the second lens mechanism 300. Because the diffractive-refractive lens 310 can eliminate the chromatic aberration, the camera apparatus does not need an additional lens for eliminating the chromatic aberration. This structure can not only eliminate the chromatic aberration to ensure imaging quality, but also reduce the number of lenses of the camera apparatus, thus reducing the size of the camera module and finally solving the conflict between the size of the camera apparatus and the thickness of the electronic device.

In the embodiments of this application, there are many materials for the diffractive-refractive lens 310. In an optional solution, the diffractive-refractive lens 310 is made of glass, and in this case, the diffractive-refractive lens 310 is a glass mechanical part. In another optional solution, the diffractive-refractive lens 310 can be made of optical plastics. In this case, the diffractive-refractive lens 310 is an optical plastics mechanical part, which is light and is beneficial to reducing the mass of the diffractive-refractive lens 310, and further to reducing the mass of the lens of the camera module. When the camera apparatus includes a zoom motor, the zoom motor can drive the lens to move. Because the mass of the lens can be reduced, the camera module does not need to be equipped with a large-power zoom motor, which is beneficial to reducing the cost of the camera apparatus and can further reduce energy consumption.

The optical plastics mechanical part can be processed by injection molding, which makes processing of the diffractive-refractive lens 310 simpler, more suitable for mass production, and the processing cost is lower. In the embodiments of this application, there may be many kinds of optical plastics, such as PC (Polycarbonate), COC (Cyclic Olefins Copolymet), COP (Cycio Olefins Polymer), and the like. A specific type of the optical plastics is not limited in the embodiments of this application.

The refractive index compensation layer 320 may be an optical imprinting adhesive layer. The optical imprinting adhesive layer can reduce the refractive index difference of the diffraction surface, and in the manufacturing process, the optical imprinting adhesive layer has good plasticity, which can further reduce the difficulty of manufacturing process. There are many kinds of materials for the optical imprinting adhesive layer. In order to achieve better results, in an optional solution, the optical imprinting adhesive layer may be a UV (ultraviolet light) curing imprinting adhesive layer or a thermosetting imprinting adhesive layer.

As mentioned above, the refractive index compensation layer 320 is overlapped with the diffractive-refractive lens 310. By adding a thinner optical imprinting adhesive layer on the optical plastics mechanical part, the problems of falling off and warping caused by different thermal expansion coefficients of the two materials after being glued can be effectively avoided, and thus the structure of the second lens mechanism 300 is more stable.

In addition, in order to have a better refraction and diffraction effect of the second lens mechanism 300, a refractive index difference $\Delta n$ between the optical plastics mechanical part and the optical imprinting adhesive layer may satisfy $0<\Delta n<0.3$ RIU (RIU, Refractive index unit).

In the embodiments of this application, the refractive index $n_1$ of the refractive index compensation layer 320 can be greater than 1.3 RIU and less than 1.9 RIU, or the thickness $h_2$ of the refractive index compensation layer 320 can be greater than 0.005 mm and less than 0.06 mm. The refractive index compensation layer 320 with this refractive index range and thickness range can effectively reduce the refractive index of the diffraction surface, so that the chromatic aberration generated in refraction and the chromatic aberration generated in diffraction can cancel each other out to a greater extent, and the imaging effect of the camera apparatus is better.

The refractive index $n_P$ of the diffractive-refractive lens 310 can be greater than 1.3 RIU and less than 1.9 RIU. The diffractive-refractive lens 310 with this refractive index range can have a better refraction effect when the projected ambient light passes through, so that the chromatic aberration generated in refraction can better cancel out the chromatic aberration generated in diffraction, and finally better imaging quality can be obtained.

A center thickness $h_{1c}$ of the diffractive-refractive lens 310 may be greater than 0.2 mm and less than 0.6 mm, and an edge thickness $h_{1E}$ of the diffractive-refractive lens 310 is greater than 0.1 mm and less than 0.5 mm. When the center thickness $h_{1c}$ of the diffractive-refractive lens 310 is greater than the edge thickness $h_{1E}$, it can play a more obvious refraction role. It should be noted that the central thickness $h_{1c}$ of the diffractive-refractive lens 310 can be considered as a thickness of a central axis of the diffractive-refractive lens 310 (that is, an optical axis of the diffractive-refractive lens 310), and the edge thickness $h_{1E}$ of the diffractive-refractive lens 310 can be considered as a thickness of a circular edge of the diffractive-refractive lens 310.

Figure 4:
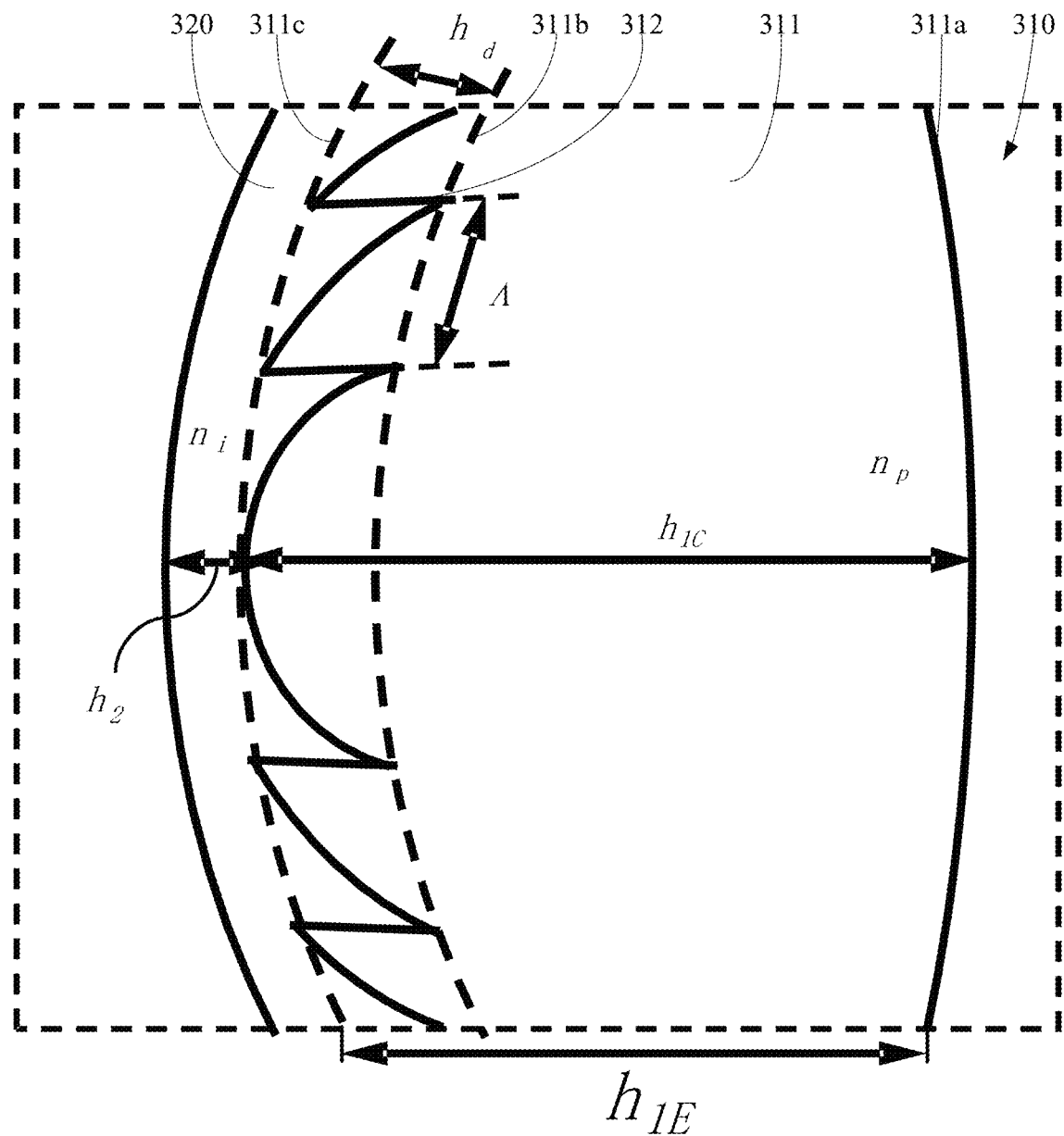
FIG. 4 is a schematic diagram of a partial structure of a second lens mechanism in a second camera apparatus according to an embodiment of this application.

In the embodiments of this application, the diffractive-refractive lens 310 includes a plurality of diffraction protrusions 312 arranged concentrically, and the plurality of concentrically arranged diffraction protrusions 312 form the diffraction structure of the diffractive-refractive lens 310. In an optional solution, the diffraction protrusion 312 may face the first lens mechanism 200, and when the ambient light passes through the diffractive-refractive lens 310, it is refracted by a refraction surface first, and then diffracted by the diffraction protrusion 312, so that the chromatic aberration generated in refraction and the chromatic aberration generated in diffraction cancel each other out. It should be noted that the refraction surface refers to a surface of the diffractive-refractive lens 310 facing away from the diffraction protrusion 312, that is, a first surface 311a described later. Certainly, the ambient light may also be diffracted by the diffraction protrusion 312 and then refracted by the refraction surface, as shown in FIG. 4.

In a further technical solution, the refractive index compensation layer 320 may be close to one side of an object plane or one side of an image plane. Specifically, when the ambient light passes through the diffractive-refractive lens 310, it is diffracted by the diffraction protrusion 312 and then processed by the refractive index compensation layer 320, or when the ambient light passes through the diffractive-refractive lens 310, it first passes through the refractive index compensation layer 320, the refractive index compensation layer 320 reduces the refractive index of the light, and then the ambient light is diffracted by the diffraction protrusion 312. A position of the refractive index compensation layer 320 is not limited in the embodiments of this application.

In the embodiments of this application, the plurality of diffraction protrusions 312 are arranged concentrically, so that the diffraction structure formed by the diffractive-refractive lens 310 can be a jagged structure. In an optional solution, in a radial direction away from the center of the diffractive-refractive lens 310, a distance between tips of two adjacent diffraction protrusions 312 (namely, a period $\Lambda$ of the diffraction structure) decreases, and then the period $\Lambda$ of the diffraction structure decreases from a center of the diffraction structure to an edge of the diffraction structure. The diffractive-refractive lens 310 is a circular lens, and the plurality of diffraction protrusions 312 are concentrically arranged annular protrusions.

In a further technical solution, the distance between the tips of two adjacent diffraction protrusions 312 (equal to the period $\Lambda$ of the diffraction structure) can be greater than 1 μm and less than 300 μm. It should be noted that the diffraction protrusion 312 has a root and a top, the top of the diffraction protrusion 312 is the tip of the diffraction protrusion 312, and the root of the diffraction protrusion 312 is the bottom of the diffraction protrusion 312. After testing, the distance between the tips of the two adjacent diffraction protrusions 312 can better ensure the diffraction effect, which is beneficial to enabling the chromatic aberration generated in diffraction to cancel out the chromatic aberration generated in refraction.

In addition, a height $h_d$ of the diffraction protrusion 312 can be greater than 0.5 µm and less than 40 µm. After testing, the diffraction effect can be well ensured by using the height of the diffraction protrusion 312. It should be noted that the height of the diffraction protrusion 312 refers to a dimension from the tip of the diffraction protrusion 312 to a tip direction. Specifically, in the radial direction away from the center of the diffractive-refractive lens 310, the height of the diffraction protrusion 312 may decrease or increase. Certainly, heights of all the diffraction protrusions 312 of the diffractive-refractive lens 310 may be equal.

In the embodiments of this application, the diffractive-refractive lens 310 further includes a basement layer 311, and the diffraction protrusions 312 are arranged on the basement layer 311. A surface of the basement layer 311 facing away from the diffraction protrusion 312 is the first surface 311a, the first surface 311a can be flat, spherical, or aspherical, and a specific surface type can be optimized based on requirements. The specific surface type of the first surface 311a is not limited in the embodiments of this application. When the surface of the basement layer 311 facing away from the diffraction protrusions 312 is spherical or aspherical, the refraction effect of the diffractive-refractive lens 310 can be further optimized.

The basement layer 311 can provide a foundation for the diffraction protrusion 312, so that the diffraction protrusion 312 has high strength and is not easy to be damaged. In addition, the basement layer 311 also facilitates the molding of the diffraction protrusion 312. Certainly, the basement layer 311 may also be made of a light-transmitting material, so as to ensure the passage of the ambient light. Specifically, the material of the basement layer 311 is the same as that of the diffraction protrusion 312, and both of them can be made of glass, optical plastics, and other materials.

In a specific implementation, when the first surface 311a is aspherical, an aspherical equation of the first surface 311a is shown in the following formula (1):

$$x_r = \frac{cr^2}{1+\sqrt{1-(1+K)c^2r^2}} + A_4r^4 + A_6r^6 + A_8r^8 + \ldots + +A_{2n}r^{2n} \quad (1)$$

In formula (1), c is a curvature of the first surface 311a, K is a conic constant, $A_{2n}$ is a 2n-power aspherical coefficient, and r is a distance between the ambient light and the optical axis. In this specification, the optical axis refers to the optical axis of the diffractive-refractive lens 310, and $x_r$ refers to a distance between each point of the first surface 311a and a base surface. The base surface is a surface that passes through a center of the first surface 311a and is perpendicular to the optical axis, and the distance is a distance along the optical axis.

In another specific implementation, a surface of the basement layer 311 for supporting the diffraction protrusion 312 is a second surface 311b, the second surface 311b is a reference surface of the diffraction structure, and the second surface 311b can be flat, spherical, or aspherical. Similarly, the specific surface type of the second surface 311b is not limited in the embodiments of this application. A surface where tips of all the diffraction protrusions 312 are located is a third surface 311c, and the height of the diffraction protrusion 312 may be considered as a distance between the second surface 311b and the third surface 311c.

When the second surface 311b is aspherical, the surface type equation of the diffraction structure is shown in the following formula (2):

$$x_d = \frac{cr^2}{1+\sqrt{1-(1+K)c^2r^2}} + \\ A_4r^4 + A_6r^6 + A_8r^8 + \ldots + +A_{2n}r^{2n} + (n - \phi/2\pi) \times h_d \quad (2)$$

In formula (2), $x_d$ is a distance between each point of the diffraction structure and the reference surface of the diffraction structure, which is the distance along the optical axis, c is a curvature of the second surface 311b, K is a conic constant, $A_{2n}$ is a 2n-power aspherical coefficient, r is a distance between the ambient light and the optical axis, and n is the number of diffraction bands counted from the center to the edge of the diffractive-refractive lens 310 included in the diffraction structure, that is, the number of diffraction protrusions 312. In a case that the diffraction protrusion 312 is an annular protrusion, an annular protrusion is a diffraction band, $h_d$ is a height of the diffraction protrusion 312 calculated according to scalar diffraction theory, that is, the distance between the third surface 311c and the second surface 311b, where 0.1 µm<$h_d$<30 µm, φ is an optical path generated in diffraction of the diffraction structure, and can be calculated in the following formula (3).

$$\phi=(c_2r^2+c_4r^4+\ldots+C_{2n}r^{2n})\times 2\pi\lambda \quad (3)$$

In formula (3), $C_{2n}$ is a 2n-power phase coefficient, λ is a wavelength of the ambient light, and r is the distance between the ambient light and the optical axis.

In the embodiments of this application, first-order diffraction of the diffraction structure is a diffraction order for imaging, while diffracted light at other orders may become glare, which may adversely affecting imaging. In order to reduce the glare phenomenon and make the first-order diffraction reach the maximum efficiency, the height $h_d$ of the diffraction structure is optimally determined by the scalar diffraction theory based on the refractive index difference $\Delta_n$ between the optical plastics mechanical part and the optical imprinting adhesive layer, and the height of the diffraction structure is the height of the diffraction protrusion 312.

In addition, the diffractive-refractive lens 310 may be in an integral injection molding structure. In a manufacturing process, the optical plastics mechanical part is first injected, and the diffraction structure on one side is injected; and then the UV curing imprinting adhesive layer is imprinted on the diffraction structure through the imprint technology. In this way, the difficulty of manufacturing process is reduced, and the efficiency of first-order diffraction can also be effectively improved.

In the camera apparatus disclosed in the embodiments of this application, a total lens number N including the diffractive-refractive lens 310 can satisfy 4≤N≤9. All specular surfaces of all lenses include at least 4 aspherical surfaces. The camera apparatus disclosed in the embodiments of this application may include a plurality of diffractive-refractive lenses 310, the diffractive-refractive lenses 310 are sequentially arranged in a projection direction of the ambient light, so as to realize a plurality of times of refraction and diffraction and achieve the purpose of better eliminating the chromatic aberration. The specific number of the diffractive-refractive lenses 310 is not limited in the embodiments of this application.

Based on the camera apparatus disclosed in the embodiments of this application, an embodiment of this application discloses an electronic device. The disclosed electronic device includes the camera apparatus described above.

There are many types of electronic devices, such as a smartphone, microphotograph equipment, an AR device, and the like. A specific type of the electronic device is not limited in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A camera apparatus, comprising a photosensitive chip, a first lens mechanism, a second lens mechanism, and a light filter, wherein the first lens mechanism is arranged between the photosensitive chip and the second lens mechanism, the second lens mechanism comprises a diffractive-refractive lens and a refractive index compensation layer, the refractive index compensation layer is overlapped with the diffractive-refractive lens, the diffractive-refractive lens and the first lens mechanism are arranged in sequence in a direction of projecting light to the photosensitive chip, the light filter is located between the photosensitive chip and the first lens mechanism, ambient light passing through the second lens mechanism can be refracted and diffracted by the diffractive-refractive lens, and the refracted and diffracted ambient light can be projected onto the photosensitive chip sequentially passing through the first lens mechanism and the light filter;

wherein a thickness of the refractive index compensation layer is greater than 0.005 mm and less than 0.06 mm;

wherein a center thickness of the diffractive-refractive lens is greater than 0.2 mm and less than 0.6 mm, and an edge thickness of the diffractive-refractive lens is greater than 0.1 mm and less than 0.5 mm; wherein the center thickness of the diffractive-refractive lens is greater than the edge thickness of the diffractive-refractive lens;

wherein the diffractive-refractive lens comprises a plurality of diffraction protrusions arranged concentrically, and a distance between tips of two of the adjacent diffraction protrusions decreases in a radial direction away from a center of the diffraction protrusions;

wherein the diffractive-refractive lens further comprises a basement layer, and the diffraction protrusions are arranged on the basement layer; wherein a surface of the basement layer facing a same direction as the diffraction protrusions is a first surface, and the first surface is a spherical surface;

wherein a surface of the basement layer where roots of the diffraction protrusions are located is a third surface, and distances between the spherical surface and the third surface comprise the center thickness and the edge thickness of the diffractive-refractive lens.

2. The camera apparatus according to claim 1, wherein the diffractive-refractive lens is an optical plastics mechanical part, and the refractive index compensation layer is an optical imprinting adhesive layer.

3. The camera apparatus according to claim 2, wherein a refractive index difference Δn between the optical plastics mechanical part and the optical imprinting adhesive layer satisfies 0<Δn<0.3 Refractive index unit (RIU).

4. The camera apparatus according to claim 1, wherein a refractive index of the diffractive-refractive lens is greater than 1.3 Refractive index unit (RIU) and less than 1.9 RIU.

5. The camera apparatus according to claim 1, wherein the distance between tips of two of the adjacent diffraction protrusions is greater than 1 μm and less than 300 μm.

6. The camera apparatus according to claim 1, wherein a height of the diffraction protrusion is greater than 0.5 μm and less than 40 μm.

7. An electronic device, comprising a camera apparatus, wherein the camera apparatus comprises a photosensitive chip, a first lens mechanism, a second lens mechanism, and a light filter, wherein the first lens mechanism is arranged between the photosensitive chip and the second lens mechanism, the second lens mechanism comprises a diffractive-refractive lens and a refractive index compensation layer, the refractive index compensation layer is overlapped with the diffractive-refractive lens, the diffractive-refractive lens and the first lens mechanism are arranged in sequence in a direction of projecting light to the photosensitive chip, the light filter is located between the photosensitive chip and the first lens mechanism, ambient light passing through the second lens mechanism can be refracted and diffracted by the diffractive-refractive lens, and the refracted and diffracted ambient light can be projected onto the photosensitive chip sequentially passing through the first lens mechanism and the light filter;

wherein a thickness of the refractive index compensation layer is greater than 0.005 mm and less than 0.06 mm;

wherein a center thickness of the diffractive-refractive lens is greater than 0.2 mm and less than 0.6 mm, and an edge thickness of the diffractive-refractive lens is greater than 0.1 mm and less than 0.5 mm; wherein the center thickness of the diffractive-refractive lens is greater than the edge thickness of the diffractive-refractive lens;

wherein the diffractive-refractive lens comprises a plurality of diffraction protrusions arranged concentrically, and a distance between tips of two of the adjacent diffraction protrusions decreases in a radial direction away from a center of the diffraction protrusions;

wherein the diffractive-refractive lens further comprises a basement layer, and the diffraction protrusions are arranged on the basement layer; wherein a surface of the basement layer facing a same direction as the diffraction protrusions is a first surface, and the first surface is a spherical surface;

wherein a surface of the basement layer where roots of the diffraction protrusions are located is a third surface, and distances between the spherical surface and the third surface comprise the center thickness and the edge thickness of the diffractive-refractive lens.

8. The electronic device according to claim 7, wherein the diffractive-refractive lens is an optical plastics mechanical part, and the refractive index compensation layer is an optical imprinting adhesive layer.

9. The electronic device according to claim 8, wherein a refractive index difference Δn between the optical plastics mechanical part and the optical imprinting adhesive layer satisfies 0<Δn<0.3 Refractive index unit (RIU).

10. The electronic device according to claim 7, wherein a refractive index of the diffractive-refractive lens is greater than 1.3 Refractive index unit (RIU) and less than 1.9 RIU.

11. The electronic device according to claim 7, wherein the distance between tips of two of the adjacent diffraction protrusions is greater than 1 μm and less than 300 μm.

12. The electronic device according to claim 7, wherein a height of the diffraction protrusion is greater than 0.5 μm and less than 40 μm.

* * * * *